(12) United States Patent
Bona (10) Patent No.: US 10,298,052 B1
(45) Date of Patent: May 21, 2019

(54) SYSTEM AND METHOD TO WIRELESSLY CHARGE A PORTABLE ELECTRONICS DEVICE UNDER AN EXTENDED POWER PROFILE

(71) Applicant: GM GLOBAL TECHNOLOGY OPERATIONS LLC, Detroit, MI (US)

(72) Inventor: Valentin Bona, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/120,917

(22) Filed: Sep. 4, 2018

(51) Int. Cl.
*H02J 7/02* (2016.01)
*H04W 4/80* (2018.01)

(52) U.S. Cl.
CPC ............... *H02J 7/025* (2013.01); *H04W 4/80* (2018.02)

(58) Field of Classification Search
CPC .................................. H04W 4/80; H02J 7/025
USPC .......................................................... 455/573
See application file for complete search history.

(56) References Cited

U.S. PATENT DOCUMENTS

| | | | |
|---|---|---|---|
| 6,333,621 B2 | 12/2001 | Yamashita | |
| 8,963,488 B2 | 2/2015 | Campanella | |
| 9,106,083 B2 * | 8/2015 | Partovi | H02J 7/025 |
| 9,812,890 B1 | 11/2017 | Leabman | |
| 9,843,202 B2 * | 12/2017 | Kdoshim | H02J 5/005 |
| 2014/0129054 A1 * | 5/2014 | Huntzicker | B60R 25/24 701/2 |
| 2014/0375258 A1 | 12/2014 | Arkhipenkov | |
| 2015/0207333 A1 * | 7/2015 | Baarman | H02J 5/005 307/104 |
| 2019/0068004 A1 * | 2/2019 | Louis | H02J 50/80 |

OTHER PUBLICATIONS

Gadgets 360 "Fast Charging Explained [YouTube Video]", viewed Aug. 14, 2018, retrieved from: https://www.youtube.com/watch?v=afiDPim42cU.

Techquickie "How Does Fast Charging Work? [YouTube Video]", viewed Aug. 14, 2018, retrieved from: https://www.youtube.com/watch?v=Zsct0T5V03M.

* cited by examiner

*Primary Examiner* — William Nealon (57) ABSTRACT

One general aspect includes a system to provide charge to a portable electronic device under an Extended Power Profile (EPP), the system including: a memory configured to include a program and a processor configured to execute the program, where the program enables the processor to: determine whether the portable electronic device can support wireless charging; if the portable electronic device can support wireless charging, determine whether the portable electronic device can support being charged under the EPP; and if the portable electronic device can support being charged under the EPP, provide charge under the EPP to the portable electronic device.

11 Claims, 3 Drawing Sheets

SYSTEM AND METHOD TO WIRELESSLY CHARGE A PORTABLE ELECTRONICS DEVICE UNDER AN EXTENDED POWER PROFILE

INTRODUCTION

Using a standard battery and charger, reenergizing a portable electronic device such as a smart phone to a full state of charge can take up to eight hours. However, with a fast charging charger the same electronic devices can be charged in a far quicker and much more convenient amount of time. Moreover, wireless charging is a convenient way of charging a device without plugging a cable into the device. It would therefore be desirable to combine the conveniences of fast charging and wireless charging. For the sake of convenience, it would also be desirable to negotiate an optimal amount of charge provided to the device before implementation of the charging platform and without any configurations needing to be made on the part of the device's owner. Furthermore, other desirable features and conveniences of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system to provide charge to a portable electronic device under an Extended Power Profile (EPP), the system including: a memory configured to include a program and a processor configured to execute the program, where the program enables the processor to: determine whether the portable electronic device can support wireless charging; if the portable electronic device can support wireless charging, determine whether the portable electronic device can support being charged under the EPP; and if the portable electronic device can support being charged under the EPP, provide charge under the EPP to the portable electronic device. Other embodiments of this aspect include corresponding computer systems, apparatus, and computer programs recorded on one or more computer storage devices, each configured to perform the actions of the methods.

Implementations may include one or more of the following features. The system further including, if the portable electronic device can support being charged under the EPP, conduct a handshake with the portable electronic device to adjust the charge provided under the EPP. The system where the handshake considers a temperature of the portable electronic device. The system further including, if the portable electronic device cannot support being charged under the EPP, provide charge under a Baseline Power Profile to the portable electronic device. The system where charge is provided to the portable electronic device via a wireless charging module. The system where the processor and portable electronic device communicate with each other via a short-range wireless communications (SRWC) protocol. The system where the memory and processor are located in a telematics unit. Implementations of the described techniques may include hardware, a method or process, or computer software on a computer-accessible medium.

One general aspect includes a method to provide charge to a portable electronic device under an Extended Power Profile (EPP), the method including: determining, via a processor, whether the portable electronic device can support wireless charging; if the portable electronic device can support wireless charging, via the processor, determining whether the portable electronic device can support being charged under the EPP; and if the portable electronic device can support being charged under the EPP, via the processor, providing charge under the EPP to the portable electronic device. Other embodiments of this aspect include corresponding computer systems, apparatus, and computer programs recorded on one or more computer storage devices, each configured to perform the actions of the methods.

Implementations may include one or more of the following features. The method further including, if the portable electronic device can support being charged under the EPP, via the processor, conducting a handshake with the portable electronic device to adjust the charge provided under the EPP. The method where the handshake considers a temperature of the portable electronic device. The method further including, if the portable electronic device cannot support being charged under the EPP, via the processor, providing charge under a Baseline Power Profile to the portable electronic device. The method where charge is provided to the portable electronic device via a wireless charging module. The method where the processor and portable electronic device communicate with each other via a short-range wireless communications (SRWC) protocol. The method where the processor is located in a telematics unit. Implementations of the described techniques may include hardware, a method or process, or computer software on a computer-accessible medium.

One general aspect includes a non-transitory and machine-readable medium having stored thereon executable instructions adapted to provide charge to a portable electronic device under an Extended Power Profile (EPP), which when provided to a processor and executed thereby, causes the processor to: determine whether the portable electronic device can support wireless charging; if the portable electronic device can support wireless charging, determine whether the portable electronic device can support being charged under the EPP; and if the portable electronic device can support being charged under the EPP, provide charge under the EPP to the portable electronic device. Other embodiments of this aspect include corresponding computer systems, apparatus, and computer programs recorded on one or more computer storage devices, each configured to perform the actions of the methods.

Implementations may include one or more of the following features. The non-transitory and machine-readable memory further including, if the portable electronic device can support being charged under the EPP, conduct a handshake with the portable electronic device to adjust the charge provided under the EPP. The non-transitory and machine-readable memory where the handshake considers a temperature of the portable electronic device. The non-transitory and machine-readable memory further including, if the portable electronic device cannot support being charged under the EPP, provide charge under a Baseline Power Profile to the portable electronic device. The non-transitory and machine-readable memory where charge is provided to the portable electronic device via a wireless charging module. The non-transitory and machine-readable memory where the processor and portable electronic device communicate with each other via a short-range wireless communications (SRWC) protocol. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
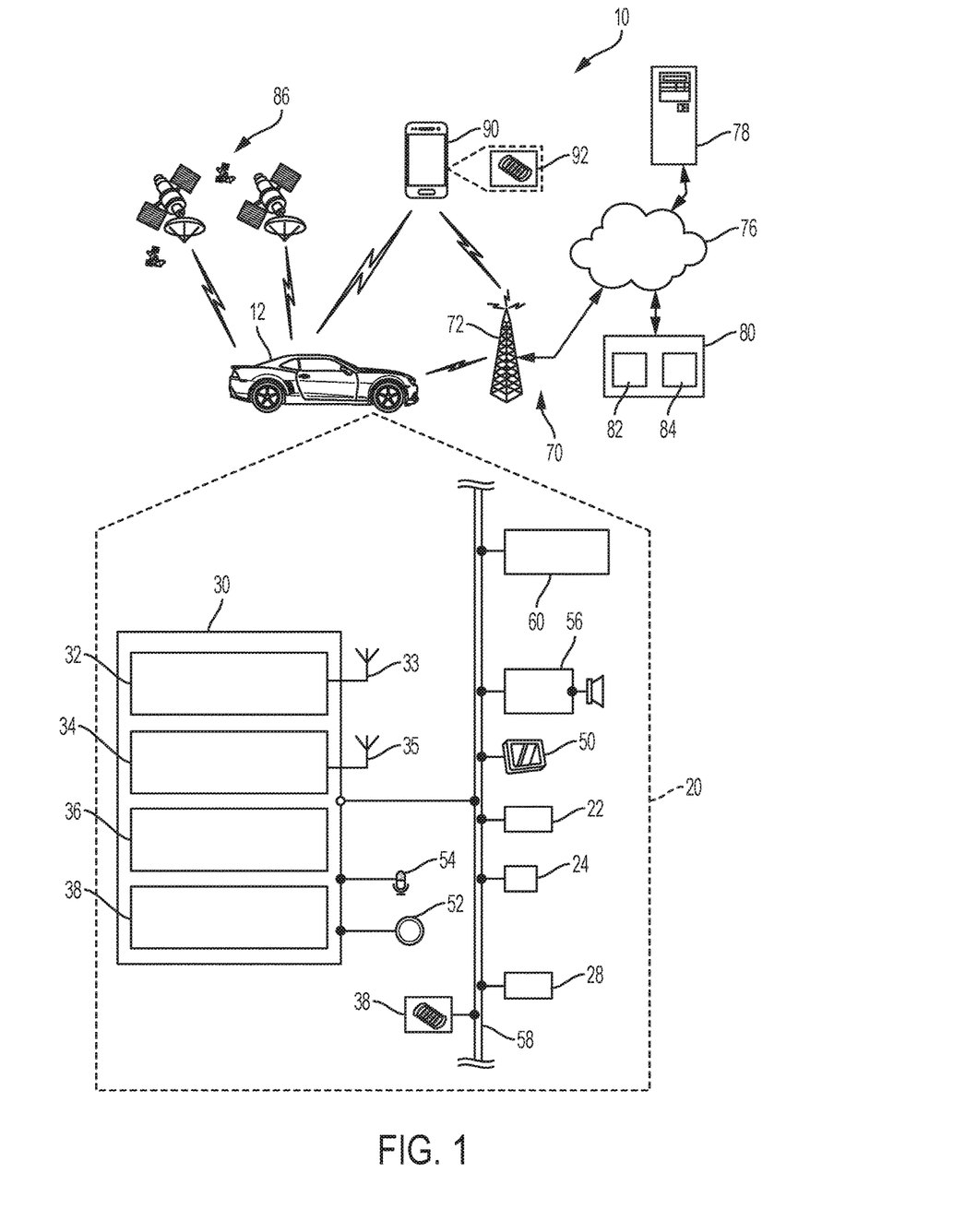
FIG. 1 is a block diagram depicting an embodiment of a communications system that is capable of utilizing the system and method disclosed herein, in accordance with exemplary embodiments.

With reference to FIG. 1, there is shown an operating environment that comprises a communications system 10 and that can be used to implement the method disclosed herein. Communications system 10 generally includes a vehicle 12 that includes vehicle electronics 20, one or more wireless carrier systems 70, a land communications network 76, a computer 78 (or server), a vehicle backend services facility 80, a constellation of global navigation satellite system (GNSS) satellites 86, and a handheld wireless device (HWD) 90. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. Some of the vehicle electronics 20 are shown generally, in FIG. 1 and includes a global navigation satellite system (GNSS) receiver 22, a body control module or unit (BCM) 24, other vehicle system modules (VSMs) 28, a telematics unit 30, a wireless charging module 38, vehicle-user interfaces 50-56, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, telematics unit 30 (vehicle communications system), wireless charging module 38, vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from computer 78 or remote facility 80 via land network 76 and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites 86. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 86. And, in another example, GNSS receiver 22 can be a BDS receiver that receives a plurality of GNSS (or BDS) signals from a constellation of GNSS (or BDS) satellites 86. The GNSS received can determine a current vehicle location based on reception of a plurality of GNSS signals from the constellation of GNSS satellites 86. The vehicle location information can then be communicated to the telematics unit 30, or other VSM, such as the onboard computer 60. In one embodiment (as shown in FIG. 1), the wireless communications module 30 and/or a telematics unit can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with wireless device 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM to direct one or more vehicle functions or operations including, for example, controlling central locking, air conditioning, power mirrors, controlling the vehicle primary mover (e.g., engine, primary propulsion system), and/or controlling various other vehicle modules. In one embodiment, the BCM 24 can be used (at least in part) to detect a vehicle event, such as a power on state or a power off state, based on one or more onboard vehicle sensor readings, as discussed more below.

Telematics unit 30 is capable of communicating data via short-range wireless communications (SRWC) through use of SRWC circuit 32 and/or via cellular network communications through use of a cellular chipset 34, as depicted in the illustrated embodiment. The telematics unit 30 can provide an interface between various VSMs of the vehicle 12 and one or more devices external to the vehicle 12, such as one or more networks or systems at remote facility 80. This enables the vehicle to communicate data or information with remote systems, such as remote facility 80.

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the device 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

In the illustrated embodiment, telematics unit 30 includes, the SRWC circuit 32, the cellular chipset 34, a processor 36, memory 38, SRWC antenna 33, and cellular antenna 35. The telematics unit 30 can be configured to communicate wirelessly according to one or more short-range wireless communications (SRWC) such as any of the Wi-Fi™, WiMAX™, Wi-Fi™ Direct, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out vehicle-to-vehicle (V2V) communications, or vehicle-to-infrastructure (V2I) communications with infrastructure systems or devices, such as the remote facility 80. And, in other embodiments, other protocols can be used for V2V or V2I communications. The short-range wireless communication (SRWC) circuitry 32 enables the telematics unit 30 to transmit and receive SRWC signals, such as BLE signals. The SRWC circuit can allow the device 30 to connect to another SRWC device. Additionally, in some embodiments, the telematics unit 30 contains a cellular chipset 34 thereby allowing the device to communicate via one or more cellular protocols, such as those used by cellular carrier system 70, by way of cellular antenna 35. In such a case, the telematics unit 30 is user equipment (UE) that can be used to in carry out cellular communications via cellular carrier system 70. Antenna 35 is used for communications during the normal operations of the telematics unit 30 and is generally known to be located throughout vehicle 12, at one or more locations external to the telematics unit 30.

Telematics unit 30 may enable the vehicle 12 to be in communication with one or more local or remote networks (e.g., one or more networks at remote facility 80 or computers 78) via packet-switched data communication. This packet switched data communication may be carried out through use of a non-vehicle wireless access point or cellular system that is connected to a land network via a router or modem. When used for packet-switched data communication such as TCP/IP, the communications device 30 can be configured with a static Internet Protocol (IP) address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Vehicle electronics 20 also includes wireless charging module 38 for wireless charging (powering) electronic devices such as, for example, handheld wireless device (HWD) 90. Wireless charging module 38 includes at least one charge cell having a transmission coil (represented as coil in FIG. 1). When the wireless charging module 38 is supplied with electric energy (i.e., from a vehicle power supply such as a battery), the transmission coil will generate a magnetic field for the wireless charging of HWD 90, as is generally known (e.g., AirPower by APPLE™). Moreover, wireless charging may conform to certain open interface standards which define wireless power transfer using inductive charging such as, for example, the Qi Standard. Wireless charging module 38 can also be embodied as a pad which is installed within the interior cabin of vehicle 12 such as, for example, the center console. The Wireless charging module 38 may also include a cooling mechanism (e.g., cooling ducts) designed to reduce the core temperature of HWD 90 while being charged. Wireless charging module 38 may also provide charge to HWD 90 at numerous charging profiles, for example, a Baseline Power Profile (e.g., 5 watts) and an Extended Power Profile (e.g., supporting up to and including 15 watts). As follows, charging under the Extended Power Profile can charge a power storage unit of HWD 90 (e.g., a lithium-ion battery) faster than the Baseline Power Profile by increasing the charging power.

A number of vehicle-user interfaces that provide vehicle occupants with a means of providing and/or receiving information, including visual display 50, pushbutton(s) 52, microphone 54, and audio system 56 are included in the vehicle electronics 20. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 58 and an entertainment bus (not shown) and can provide AM, FM and satellite radio, CD, DVD and other multimedia functionality. This functionality can be provided in conjunction with or independent of an infotainment module. Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or other display. Various other vehicle-user interfaces can also be utilized, as the interfaces of FIG. 1 are only an example of one particular implementation.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components that may be needed to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 (only one shown) can be used for one or more purposes, such as for providing backend vehicle services to a plurality of vehicles (such as vehicle 12) and/or for providing other vehicle-related services. The computers 78 can be some of a number of computers accessible via a private or public network such as the Internet. Other such accessible computers 78 can be, for example: a service center computer where diagnostic information and other vehicle data can be uploaded from the vehicle; a client computer used by the vehicle owner or other subscriber for various purposes, such as accessing and/or receiving data communicated from the vehicle, as well as setting up and/or configuring subscriber preferences or controlling vehicle functions; or a vehicle telemetry data server that receives and stores data from a plurality of vehicles.

Vehicle backend services facility 80 is a remote facility, meaning that it is located at a physical location that is located remotely from the vehicle 12. The vehicle backend services facility 80 (or "remote facility 80" for short) may be designed to provide the vehicle electronics 20 with a number of different system back-end functions through use of one or more electronic servers 82. The vehicle backend services facility 80 includes vehicle backend services servers 82 and databases 84, which may be stored on a plurality of memory devices. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally stored instructions, such as software or firmware, which enable the servers 82 to provide a wide variety of services. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases at the remote facility 80 can store various information and can include a vehicle operation database that stores information regarding the operation of various vehicles (e.g., vehicle telemetry or sensor data). Also, the remote server 80 can receive can thus act to distribute software (and/or software updates) to the various vehicles including vehicle 12.

The handheld wireless device (HWD) 90 is a portable electronic device capable of SRWC and may include: hardware, software, and/or firmware enabling cellular telecommunications and SRWC as well as other mobile device applications. The hardware of the HWD 90 may comprise: a processor and memory for storing the software, firmware, etc. The HWD processor and memory may enable various software applications, which may be preinstalled or installed by the user (or manufacturer) (e.g., having a software application or graphical user interface (GUI)). Additionally, one or more applications may allow the user to connect with the remote facility 80 or call center advisors at any time.

In one particular embodiment, the HWD 90 can be a personal cellular and SRWC device that includes a cellular chipset and/or cellular connectivity capabilities, as well as SRWC capabilities. Using a cellular chipset, for example, the HWD 90 can connect with various remote devices, including computers 78 and remote server facility 80, via wireless carrier system 70. As used herein, a personal SRWC device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. In many embodiments, the HWD 90 is a personal SRWC device. And, in some embodiments, the HWD 90 does not include a cellular chipset, but is only capable of SRWC communications.

The processor of the HWD 90 can be any type of device capable of processing electronic instructions including microprocessors, microcontrollers, host processors, controllers, vehicle communication processors, and application specific integrated circuits (ASICs). The HWD processor unit (not shown) executes various types of digitally-stored instructions, such as software or firmware programs stored in a memory device (not shown) of the HWD 90, which enable the device 90 to provide a wide variety of functionality. For instance, in one embodiment, the processor can execute programs or process data. In some embodiments, the HWD 90 can be a smartphone or tablet that includes an operating system, such as Android™, iOS™, Microsoft Windows™, and/or other operating systems. The memory of the HWD 90 may include any suitable non-transitory, computer readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), or magnetic or optical disc drives. In one embodiment, the memory of HWD 90 may be a non-volatile memory card, such as a Secure Digital™ (SD) card, that is inserted into a card slot of HWD 90.

The HWD 90 can also include a short-range wireless communications (SRWC) circuit and/or chipset as well as one or more antennas, which allows it to carry out SRWC, such as any of the IEEE 802.11 protocols, Wi-Fi™, WiMAX™, ZigBee™, Wi-Fi Direct™, Bluetooth™, or near field communication (NFC). The SRWC circuit and/or chipset may allow HWD 90 to connect to telematics unit 30 via a SRWC communications protocol. Additionally, HWD 90 can include a cellular chipset thereby allowing the device to communicate via one or more cellular protocols, such as GSM/GPRS technology, CDMA or CDMA2000 technology, and LTE technology. The HWD 90 may communicate data over wireless carrier system 70 using the cellular chipset and an antenna. The HWD 90 may also include a temperature sensor configured to read the temperature of the device's internal components such as, for example, the power storage unit.

The HWD 90 can also include a receiving coil 92 for the reception of energy from external power sources such as, for example, wireless charging module 38. The receiving coil 92 is connected to the power storage unit of HWD 90. Moreover, when the receiving coil 92 is inductively connected to an inductive power component such as the wireless charging module 38, the magnetic field generated by the transmission coil of the module's 38 charge cell will induce a current in the receiving coil 92 that will in turn charge the HWD's 90 power storage unit.

METHOD

Figure 2:
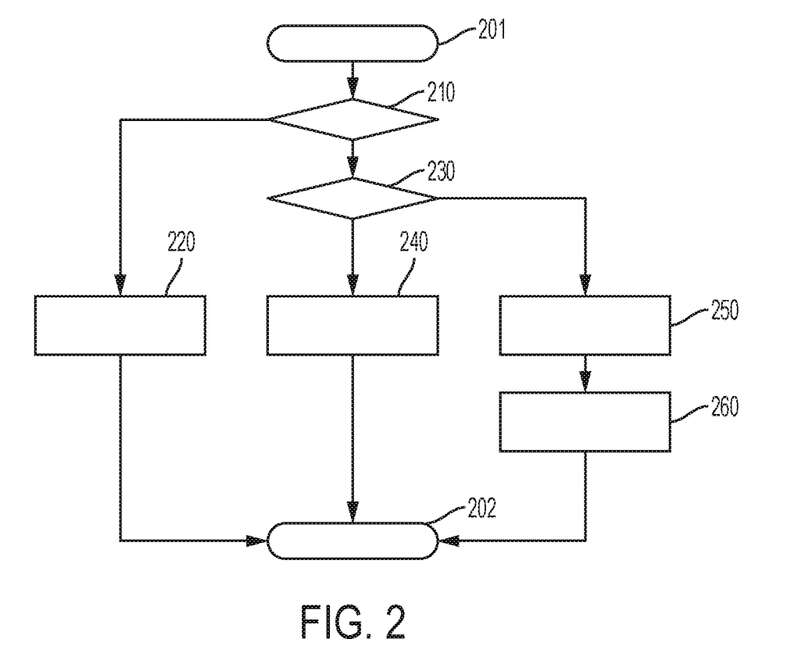
FIG. 2 is a flowchart of an exemplary process to provide charge to a portable electronic device under an Extended Power Profile in accordance with one or more exemplary embodiments.

Now turning to FIG. 2, there is shown an embodiment of a method 200 to determine a charge profile to be handled by HWD 90 and in turn provide HWD 90 with a negotiated charge under that charge profile. One or more aspects of the extended-charge method 200 may be completed through vehicle telematics unit 30 which may include one or more executable instructions (programs) incorporated into memory device 38 and carried out by processor 36 (controller). One or more ancillary aspects of method 200 may otherwise, for example, be completed through HWD 90 which may include one or more executable instructions incorporated into its memory device and carried out by its HWD processor unit. One or more ancillary aspects of method 200 may also be completed by wireless charging module 38.

Method 200 is supported by telematics unit 30 being configured to establish one or more SRWC communications with HWD 90 over a SRWC protocol. This configuration may be established by a vehicle manufacturer at or around the time of the telematics unit's assembly or aftermarket (e.g., via vehicle download using the afore-described communication system 10 or at a time of vehicle service, just to name a couple of examples). In at least one implementation, one or more instructions are provided to the telematics unit 30 and stored on non-transitory computer-readable medium (e.g., memory device 38).

Figure 3:
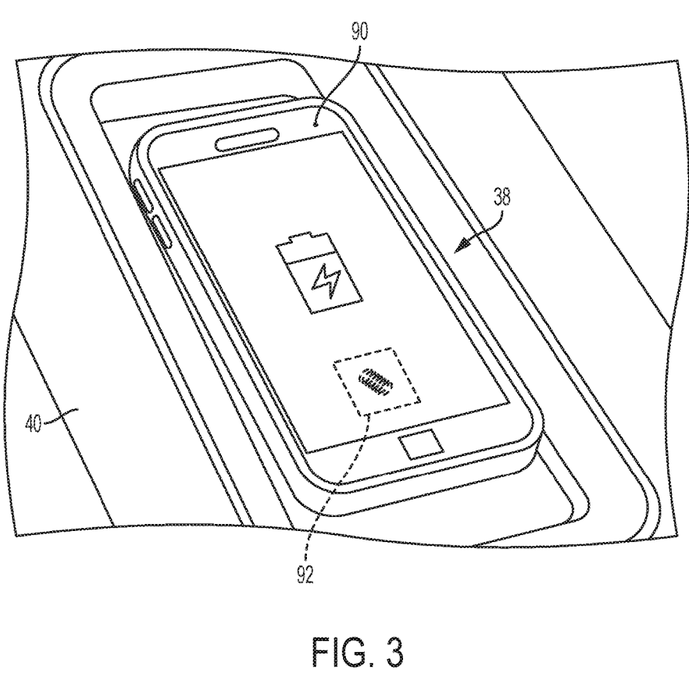
FIG. 3 is an exemplary aspect of the exemplary process of FIG. 2 in accordance with one or more exemplary embodiments.

Method 200 begins at 201 in which a SWRC communications protocol is established to allow the HWD 90 and telematics unit 30 to communicate via an SWRC protocol. In 201, HWD 90 may also be placed on top of the wireless charging module 38 located on a center console 40 within the interior cabin of vehicle 12 (as shown in FIG. 3).

In step 210, via short-range wireless communications, the telematics unit 30 requests from HWD 90 an acknowledgement as to whether the device can support wireless charging and the HWD 90 responds with an answer as to whether the device supports such wireless charging. Moreover, if HWD 90 can support wireless charging, method 200 will move to step 220; otherwise, method will move to step 230. As mentioned above, wireless charging uses an electromagnetic field to transfer energy from a power supplying device to another power receiving device through electromagnetic induction.

In step 220, since HWD 90 does not support wireless charging, telematics unit 30 will remove power from being supplied to the wireless charging module 38 such that the module simply acts as surface for which HWD 90 can rest upon. In addition, since it can be assumed HWD 90 only supports wired charging, telematics unit 30 may route power to one or more sockets configured to have some type of power cord installed therein. This will allow the HWD 90 to be charged via the power cord installed in one of the powered sockets. After step 220, method 200 moves to completion 202.

In step 230, the telematics unit 30 requests from HWD 90 an acknowledgement as to whether the device can support being charged under an Extended Power Profile (EPP) and the HWD 90 responds with an answer as to whether the device supports being charged under the EPP. Moreover, if HWD 90 can support being charged under the EPP, method 200 will move to step 250; otherwise, method will move to step 240. As mentioned above, extended charging offers more power and thus charges the power storage unit of HWD 90 faster than baseline charging will allow.

In step 240, since HWD 90 does not support being charged under the EPP, telematics unit 30 set wireless charging module 38 to a Baseline Power Profile (BPP). Moreover, in this step, telematics unit 30 will route power to charge HWD 90 under the BPP and HWD 90 will thus be charged under the BPP. In general, as will be recognized by skilled artists, the BPP will provide at most five (5) watts of power to HWD 90.

In step 250, telematics unit 30 will set wireless charging module 38 to the EPP. In step 260, telematics unit 30 will conduct a handshake process with HWD 90 to determine an optimum wattage of power to be supplied to HWD 90 and without exceeding a maximum charging threshold for the device. The handshake will thus ensure that the power storage unit is not provided with such an excessive amount of power so as to create a hazard. Moreover, based on the outcome of the handshake process, telematics unit 30 will adjust the maximum amount of charge to be provided under the EPP. For example, the telematics unit 30 and HWD 90 will negotiate an optimal amount of charge that may be delivered to the HWD 90 based upon the design specification for hardware of the HWD 90. As such, if the EPP could potentially deliver charge at 15 watts but the hardware of the HWD 90 (e.g., the power storage unit) is only designed to handle 12 watts, telematics unit 30 will recognize this limitation and adjust the amount of charge provided to be approximately 12 watts (i.e., by limiting amperage). Telematics unit 30 may also recognize when HWD 90 has finished being charged by the wireless charging module 38 under the EPP and reset the amount of charge to be delivered under the EPP to a default setting.

In various embodiments, the temperature of the HWD 90 may be also taken into consideration during the handshaking to further ensure a safe amount of charge is to be delivered to HWD 90. For example, the power storage unit's temperature may be measured by a temperature sensor and then compared to a predetermined temperature threshold that has been deemed to be the maximum temperature the HWD 90 can safely reach, while being charged under the EPP (i.e., to prevent the HWD 90 from becoming hazardous). As follows, if the temperature of HWD 90 exceeds this predetermined temperature threshold, then telematics unit 30 will reduce the negotiated optimal rate of charge which can be delivered to HWD 90 to an amount that should return the HWD 90 to a safe temperature. For example, if the negotiated optimal amount of charge is 12 watts but the temperature exceeds the threshold, telematics unit 30 may incrementally reduce the amount of charge (e.g., by 2 watts per increment) until the power storage unit's temperature constantly remains below the threshold. In various embodiments, if the temperature of HWD 90 exceeds this predetermined temperature threshold, telematics unit 30 may activate a cooling mechanism (e.g., a cooling duct) in the wireless charging module 38 or reroute an air-conditioned airflow in the vehicle cabin. This cooling mechanism/airflow rerouting would help to reduce the temperature of the HWD 90 during delivery of the charge, so that the temperature will be reduced to below and stay below the temperature threshold. If the internal temperature indicates the HWD 90 is below this temperature threshold, however, telematics unit 30 will merely provide charge at the otherwise negotiated optimal amount of charge. After step 260, method 200 moves to completion 202.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A system to provide charge to a portable electronic device under an Extended Power Profile (EPP), the system comprising:
    a memory configured to comprise a program and a processor configured to execute the program, wherein the program enables the processor to:
    determine whether the portable electronic device can support wireless charging;
    if the portable electronic device can support wireless charging, determine whether the portable electronic device can support being charged under the EPP;
    if the portable electronic device can support being charged under the EPP, conduct a handshake with the portable electronic device;
    based on the handshake, provide a negotiated rate of charge under the EPP to the portable electronic device via a wireless charging module comprising a cooling mechanism;
    measure a temperature of a power storage unit of the portable electronic device to ensure a safe amount of charge is being delivered to the portable electronic device;
    compare the temperature to a temperature threshold;
    when the temperature exceeds the temperature threshold, incrementally reduce the negotiated rate of charge under the EPP until the temperature is below the temperature threshold;
    when the temperature exceeds the temperature threshold, activate the cooling mechanism so as to help reduce the temperature; and
    wherein the EPP is the Qi Standard power profile allowing a power transfer up to and including 15 watts.

2. The system of claim 1, further comprising: if the portable electronic device cannot support being charged under the EPP, provide charge under a Baseline Power Profile (BPP) to the portable electronic device, wherein the BPP is the Qi Standard power profile allowing a power transfer of no more than five watts.

3. The system of claim 1, wherein the processor and portable electronic device communicate with each other via a short-range wireless communications (SRWC) protocol.

4. The system of claim 1, wherein the memory and processor are located in a telematics unit.

5. A method to provide charge to a portable electronic device under an Extended Power Profile (EPP), the method comprising:
    determining, via a processor, whether the portable electronic device can support wireless charging;
    if the portable electronic device can support wireless charging, via the processor, determining whether the portable electronic device can support being charged under the EPP;
    if the portable electronic device can support being charged under the EPP, via the processor, conducting a handshake with the portable electronic device;
    based on the handshake, via the processor, providing a negotiated rate of charge under the EPP to the portable electronic device via a wireless charging module comprising a cooling mechanism;
    measuring, via the processor, a temperature of a power storage unit of the portable electronic device to ensure a safe amount of charge is being delivered to the portable electronic device;
    comparing, via the processor, the temperature to a temperature threshold;

when the temperature exceeds the temperature threshold, via the processor, incrementally reducing the negotiated rate of charge under the EPP until the temperature is below the temperature threshold;

when the temperature exceeds the temperature threshold, via the processor, activating the cooling mechanism so as to help reduce the temperature; and wherein the EPP is the Qi Standard power profile allowing a power transfer up to and including 15 watts.

6. The method of claim 5, further comprising: if the portable electronic device cannot support being charged under the EPP, via the processor, providing charge under a Baseline Power Profile (BPP) to the portable electronic device, wherein the BPP is the Qi Standard power profile allowing a power transfer of no more than five watts.

7. The method of claim 5, wherein the processor and portable electronic device communicate with each other via a short-range wireless communications (SRWC) protocol.

8. The method of claim 5, wherein the processor is located in a telematics unit.

9. A non-transitory and machine-readable medium having stored thereon executable instructions adapted to provide charge to a portable electronic device under an Extended Power Profile (EPP), which when provided to a processor and executed thereby, causes the processor to:

determine whether the portable electronic device can support wireless charging;

if the portable electronic device can support wireless charging, determine whether the portable electronic device can support being charged under the EPP;

if the portable electronic device can support being charged under the EPP, conduct a handshake with the portable electronic device;

based on the handshake, provide a negotiated rate of charge under the EPP to the portable electronic device via a wireless charging module comprising a cooling mechanism;

measure a temperature of a power storage unit of the portable electronic device to ensure a safe amount of charge is being delivered to the portable electronic device;

compare the temperature to a temperature threshold;

when the temperature exceeds the temperature threshold, incrementally reduce the negotiated rate of charge under the EPP until the temperature is below the temperature threshold;

when the temperature exceeds the temperature threshold, activate the cooling mechanism so as to help reduce the temperature; and wherein the EPP is the Qi Standard power profile allowing a power transfer up to and including 15 watts.

10. The non-transitory and machine-readable memory of claim 9, further comprising: if the portable electronic device cannot support being charged under the EPP, provide charge under a Baseline Power Profile (BPP) to the portable electronic device, wherein the BPP is the Qi Standard power profile allowing a power transfer of no more than five watts.

11. The non-transitory and machine-readable memory of claim 9, wherein the processor and portable electronic device communicate with each other via a short-range wireless communications (SRWC) protocol.

* * * * *